US009367166B1

(12) United States Patent
Kremin

(10) Patent No.: US 9,367,166 B1
(45) Date of Patent: Jun. 14, 2016

(54) SYSTEM AND METHOD OF VISUALIZING CAPACITANCE SENSING SYSTEM OPERATION

(75) Inventor: Viktor Kremin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 1362 days.

(21) Appl. No.: 12/004,831

(22) Filed: Dec. 21, 2007

(51) Int. Cl.
G06F 3/041 (2006.01)
G06F 3/0354 (2013.01)

(52) U.S. Cl.
CPC .......... G06F 3/0416 (2013.01); G06F 3/03547 (2013.01)

(58) Field of Classification Search
CPC ... G06F 3/044; G06F 1/1694; G06F 3/03547; G06F 3/0488; G06F 3/04883; G06F 3/04886; G06F 3/03545; G06F 3/041; G06F 3/0412; G06F 2203/04104; G06F 3/0418; G06F 2203/04106; G06F 11/26; G06F 17/50; H04L 41/22; G01R 27/26; G01R 27/2605; G01R 35/00; G05B 2219/23258; G05B 2219/32342; G05B 2219/32128; G05B 23/0216; Y10S 706/92; Y10S 715/97
USPC ................................ 715/771; 703/4; 345/174
See application file for complete search history.

(56) References Cited

U.S. PATENT DOCUMENTS

| | | | | |
|---|---|---|---|---|
| 4,581,483 A * | 4/1986 | Ralston | ....................... | 178/20.01 |
| 4,695,833 A * | 9/1987 | Ogura et al. | ............... | 345/440.1 |
| 4,823,283 A * | 4/1989 | Diehm et al. | ................. | 715/825 |
| 5,376,946 A * | 12/1994 | Mikan | ........................... | 345/157 |
| 5,381,344 A * | 1/1995 | Rohrbaugh et al. | .......... | 716/136 |
| 5,428,367 A * | 6/1995 | Mikan | ........................... | 345/157 |
| 5,514,504 A * | 5/1996 | Iijima et al. | ...................... | 430/20 |
| 5,581,243 A * | 12/1996 | Ouellette et al. | .............. | 345/173 |
| 5,748,881 A * | 5/1998 | Lewis et al. | ................... | 714/47.3 |
| 5,805,166 A * | 9/1998 | Hall et al. | ...................... | 715/839 |
| 5,808,920 A * | 9/1998 | Zwan et al. | .................... | 702/120 |
| 5,825,352 A * | 10/1998 | Bisset et al. | .................... | 345/173 |
| 5,855,483 A * | 1/1999 | Collins et al. | ................. | 434/322 |
| 5,872,952 A * | 2/1999 | Tuan | .................. | G01R 31/2848 257/E23.079 |
| 5,903,469 A * | 5/1999 | Ho | ....................... | G06F 17/5081 716/115 |
| 5,956,665 A * | 9/1999 | Martinez et al. | .............. | 702/188 |
| 6,002,395 A * | 12/1999 | Wagner et al. | ................ | 715/763 |
| 6,122,603 A * | 9/2000 | Budike, Jr. | ..................... | 702/182 |
| 6,124,848 A * | 9/2000 | Ballare et al. | .................. | 345/179 |
| 6,161,126 A * | 12/2000 | Wies | ....................... | G05B 19/00 709/203 |
| 6,181,328 B1 * | 1/2001 | Shieh et al. | .................... | 345/178 |
| 6,188,407 B1 * | 2/2001 | Smith et al. | .................... | 715/841 |
| 6,212,650 B1 * | 4/2001 | Guccione | ......................... | 714/32 |
| 6,219,046 B1 * | 4/2001 | Thomas et al. | ............... | 715/708 |

(Continued)

OTHER PUBLICATIONS

"Wikipedia—Raw Data;" http://web.archive.org/web/20060913000000/http://en.wikipedia.org/wiki/Raw_data; Sep. 13, 2006.*

(Continued)

Primary Examiner — Eric Wiener

(57) ABSTRACT

Systems and methods of visualizing capacitance sensing system operation. A graphical user interface for visualizing capacitance sensing system operation includes a first window. The window includes a representation of a physical layout of a plurality of sensor devices on a target apparatus. The graphical user interface is operable to accept input from a pointing device to select a selected sensor from the plurality of sensor devices. A second window is for displaying capacitive sensing data of the selected sensor.

20 Claims, 3 Drawing Sheets

(56) References Cited

U.S. PATENT DOCUMENTS

| | | | |
|---|---|---|---|
| 6,275,229 B1* | 8/2001 | Weiner et al. | 715/764 |
| 6,442,440 B1* | 8/2002 | Miller | 700/83 |
| 6,556,223 B1* | 4/2003 | Tran et al. | 715/804 |
| 6,559,868 B2* | 5/2003 | Alexander et al. | 715/781 |
| 6,577,323 B1* | 6/2003 | Jamieson et al. | 715/700 |
| 6,587,108 B1* | 7/2003 | Guerlain et al. | 345/440 |
| 6,611,253 B1* | 8/2003 | Cohen | 345/168 |
| 6,658,626 B1* | 12/2003 | Aiken | 715/205 |
| 6,675,001 B2* | 1/2004 | Hudecek et al. | 455/150.1 |
| 6,731,129 B1* | 5/2004 | Belluomini et al. | 324/678 |
| 6,834,195 B2* | 12/2004 | Brandenberg et al. | 455/456.3 |
| 6,901,560 B1* | 5/2005 | Guerlain et al. | 715/833 |
| 6,913,531 B1* | 7/2005 | Yoseloff | 463/13 |
| 6,952,808 B1* | 10/2005 | Jamieson et al. | 715/833 |
| 7,183,905 B2* | 2/2007 | Neubauer et al. | 340/506 |
| 7,221,279 B2* | 5/2007 | Nielsen | 340/604 |
| 7,275,235 B2* | 9/2007 | Molinari | G01R 13/345 717/100 |
| 7,479,790 B2* | 1/2009 | Choi | 324/663 |
| 7,499,848 B2* | 3/2009 | Irons | 703/23 |
| 7,523,349 B2* | 4/2009 | Barras | 714/25 |
| 7,576,304 B2* | 8/2009 | Kraz | 219/506 |
| 7,620,897 B2* | 11/2009 | Shah et al. | 715/734 |
| 7,647,126 B2* | 1/2010 | Blevins et al. | 700/49 |
| 7,676,280 B1* | 3/2010 | Bash et al. | 700/17 |
| 7,702,409 B2* | 4/2010 | Lucas et al. | 700/96 |
| 7,720,552 B1* | 5/2010 | Lloyd | 700/10 |
| 7,729,789 B2* | 6/2010 | Blevins et al. | 700/83 |
| 7,812,619 B2* | 10/2010 | Tanida et al. | 324/658 |
| 7,827,526 B2* | 11/2010 | Huin et al. | 717/109 |
| 7,941,565 B2* | 5/2011 | Vail | 709/250 |
| 7,943,967 B2* | 5/2011 | Becker | H01L 27/0207 257/206 |
| 8,089,288 B1* | 1/2012 | Maharita | 324/678 |
| 8,185,892 B2* | 5/2012 | Lucas et al. | 717/178 |
| 8,269,725 B2* | 9/2012 | Hall | G06F 3/0418 178/18.01 |
| 8,416,198 B2* | 4/2013 | Rathnam et al. | 345/173 |
| 8,525,799 B1* | 9/2013 | Grivna et al. | 345/173 |
| 8,584,029 B1* | 11/2013 | Gerde et al. | 715/771 |
| 8,717,302 B1* | 5/2014 | Qin et al. | 345/173 |
| 2001/0040553 A1* | 11/2001 | Rosenberg | 345/158 |
| 2002/0126099 A1* | 9/2002 | Engholm | 345/173 |
| 2002/0163498 A1* | 11/2002 | Chang | G06F 3/016 345/156 |
| 2003/0058280 A1* | 3/2003 | Molinari et al. | 345/771 |
| 2003/0088395 A1* | 5/2003 | Frech | G06F 17/5036 703/18 |
| 2003/0098858 A1* | 5/2003 | Perski et al. | 345/173 |
| 2003/0186199 A1* | 10/2003 | McCool et al. | 434/219 |
| 2003/0237059 A1* | 12/2003 | Schultz | G06F 17/5036 716/111 |
| 2004/0001096 A1* | 1/2004 | Tamura et al. | 345/771 |
| 2004/0128637 A1* | 7/2004 | Teene | G06F 17/5036 716/115 |
| 2004/0183718 A1* | 9/2004 | Hagg | 342/124 |
| 2004/0246252 A1* | 12/2004 | Morrow et al. | 345/440 |
| 2005/0010883 A1* | 1/2005 | Wood | G06F 17/5036 716/113 |
| 2005/0132306 A1* | 6/2005 | Smith | G06F 17/5068 716/114 |
| 2005/0194649 A1* | 9/2005 | Oki | 257/409 |
| 2006/0007151 A1* | 1/2006 | Ram | 345/163 |
| 2006/0007170 A1* | 1/2006 | Wilson et al. | 345/173 |
| 2006/0066582 A1* | 3/2006 | Lyon et al. | 345/173 |
| 2006/0066588 A1* | 3/2006 | Lyon et al. | 345/173 |
| 2006/0095230 A1* | 5/2006 | Grier et al. | 702/183 |
| 2006/0119578 A1* | 6/2006 | Kesavadas et al. | 345/161 |
| 2006/0174217 A1* | 8/2006 | Yan et al. | 715/866 |
| 2006/0208808 A1* | 9/2006 | Bang et al. | 331/16 |
| 2006/0221061 A1* | 10/2006 | Fry | 345/173 |
| 2006/0244732 A1* | 11/2006 | Geaghan | 345/173 |
| 2006/0279548 A1* | 12/2006 | Geaghan | 345/173 |
| 2007/0052690 A1* | 3/2007 | Roberts | 345/173 |
| 2007/0226555 A1* | 9/2007 | Raines | 714/724 |
| 2007/0266433 A1* | 11/2007 | Moore | 726/15 |
| 2007/0273659 A1* | 11/2007 | XiaoPing et al. | 345/173 |
| 2008/0001923 A1* | 1/2008 | Hall et al. | 345/173 |
| 2008/0024455 A1* | 1/2008 | Lee et al. | 345/173 |
| 2008/0036473 A1* | 2/2008 | Jansson | 324/678 |
| 2008/0042641 A1* | 2/2008 | Stockman | 324/157 |
| 2008/0046425 A1* | 2/2008 | Perski | 707/6 |
| 2008/0061800 A1* | 3/2008 | Reynolds et al. | 324/678 |
| 2008/0120335 A1* | 5/2008 | Dolgoff | 707/104.1 |
| 2008/0142281 A1* | 6/2008 | Geaghan | 178/18.06 |
| 2008/0147362 A1* | 6/2008 | Bolender et al. | 703/4 |
| 2008/0155354 A1* | 6/2008 | Kolman | 714/45 |
| 2008/0215302 A1* | 9/2008 | Nasle | G06F 17/5009 703/13 |
| 2008/0238433 A1* | 10/2008 | Joutsenoja et al. | 324/457 |
| 2008/0263469 A1* | 10/2008 | Nasle et al. | 715/771 |
| 2008/0266271 A1* | 10/2008 | Van Berkel et al. | 345/174 |
| 2008/0288666 A1* | 11/2008 | Hodges et al. | 710/9 |
| 2008/0316184 A1* | 12/2008 | D'Souza | 345/173 |
| 2009/0008161 A1* | 1/2009 | Jones et al. | 178/18.06 |
| 2009/0019429 A1* | 1/2009 | Randow et al. | 717/130 |
| 2009/0021332 A1* | 1/2009 | Brekelmans et al. | 334/55 |
| 2009/0025987 A1* | 1/2009 | Perski et al. | 178/18.03 |
| 2009/0037030 A1* | 2/2009 | Chidambaram et al. | 700/297 |
| 2009/0066674 A1* | 3/2009 | Maharyta et al. | 345/178 |
| 2009/0116742 A1* | 5/2009 | Nishihara | 382/173 |
| 2009/0127003 A1* | 5/2009 | Geaghan | 178/18.03 |
| 2010/0061378 A1* | 3/2010 | Joyner et al. | 370/395.53 |
| 2011/0028194 A1* | 2/2011 | Tang et al. | 463/1 |

OTHER PUBLICATIONS

"Webopedia—Raw Data;" http://web.archive.org/web/20071207201747/http://www.webopedia.com/TERM/R/raw_data.html; Dec. 7, 2007.*

"MicroNav Integration Guide Version 3.0", retrieved from <http://www.steadlands.com/data/interlink/micronavintauide.pdf>, (Dec. 31, 2003),11 pages.*

* cited by examiner

SYSTEM AND METHOD OF VISUALIZING CAPACITANCE SENSING SYSTEM OPERATION

FIELD OF INVENTION

Embodiments of the present invention relate to the field of configurable integrated circuits. More specifically, embodiments of the present invention relate to systems and methods of visualizing capacitance sensing system operation.

BACKGROUND

The semiconductor industry has developed a wide range of integrated circuits that may be configured, e.g., customized, by system designers, as opposed to integrated circuit designers, to perform a wide variety of tasks that previously would have required a customized integrated circuit design. Such integrated circuits include field programmable gate arrays (FPGAs), complex programmable logic devices (CPLDs), field programmable analog arrays (FPAAs) and the like.

One exemplary family of configurable integrated circuits is the PSoC® programmable system on a chip integrated circuit family, commercially available from Cypress Semiconductor of San Jose, Calif. One set of products, PSoC® mixed-signal arrays, are programmable systems-on-chips (SOCs) that integrate a microcontroller and the analog and digital components that typically surround it in an embedded system. A single PSoC® device can integrate as many as 100 peripheral functions with a microcontroller, saving customers design time, board space, power consumption, and bill of materials cost.

PSoC® mixed-signal arrays are well suited to capacitive sensing applications. Capacitive sensing generally includes capacitive sensors for buttons (switches), linear and radial sliders, touchpads, touchscreens and the like. User interaction with such sensors is detected by changes in capacitance among such sensors. For example, rather than detecting a make or break of electrical contacts, capacitive sensing detects changes in capacitance to determine button activation.

Unfortunately, the physical design of such sensors, as well as capacitive interaction of such sensors with other physical elements of a target device requires a great amount of tuning, debugging and parametric optimization of a capacitance sensing system in the target application in order to achieve satisfactory function.

Under the conventional art, this process is cumbersome and error-prone at best. For example, optimization of capacitance sensing applications generally requires monitoring raw capacitive sensing data ("counts"), baseline and other data in real time. Such optimization in the target hardware is required to set a variety of processing parameters according to the sensors geometrical dimensions, overlay thickness and dielectric properties. Additionally, this data should be monitored to check performance margins, test system operation under temperature, humidity and various noise sources influence.

Unfortunately, conventional art tools are not optimized for capacitance sensing applications, and the data is represented in a non-intuitive manner. For example, a conventional art charting tool may present button activation capacitive data in a non-intuitive graphical format. In addition, most such tools require a user to manually enter command strings in order to obtain such data. Such tools do not relate well to the capacitance sensing application, are cumbersome and error prone.

SUMMARY OF THE INVENTION

Therefore, systems and methods of visualizing capacitance sensing system operation are needed. In addition, systems and methods of visualizing capacitance sensing system operation that present capacitance sensing information in an intuitive manner corresponding to a physical arrangement of a target apparatus are needed. A further need exists for systems and methods of visualizing capacitance sensing system operation that automatically generate commands to a target apparatus are needed. A still further need exists for systems and methods of visualizing capacitance sensing system operation that are compatible and complimentary with existing methods of integrated circuit device configuration. Embodiments of the present invention provide these advantages.

Accordingly, systems and methods of visualizing capacitance sensing system operation are disclosed. A graphical user interface for visualizing capacitance sensing system operation includes a first window. The window includes a representation of a physical layout of a plurality of sensor devices on a target apparatus. The graphical user interface is operable to accept input from a pointing device to select a selected sensor from the plurality of sensor devices. A second window is for displaying capacitive sensing data of the selected sensor.

In accordance with a method embodiment of the present invention, a method for visualizing capacitance sensing system operation includes displaying a graphical user interface including a first window for display of a representation of a physical layout of a capacitive sensing system, and accepting input from a pointing device to select a selected sensor of the plurality of sensors. Responsive to the selecting, a command stream is sent to the capacitive sensing system to send capacitive sensing information corresponding to the selected sensor from the capacitive sensing system to the capacitive visualization system. The capacitive sensing information is displayed in a second widow of the graphical user interface.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

DETAILED DESCRIPTION

Figure 1:
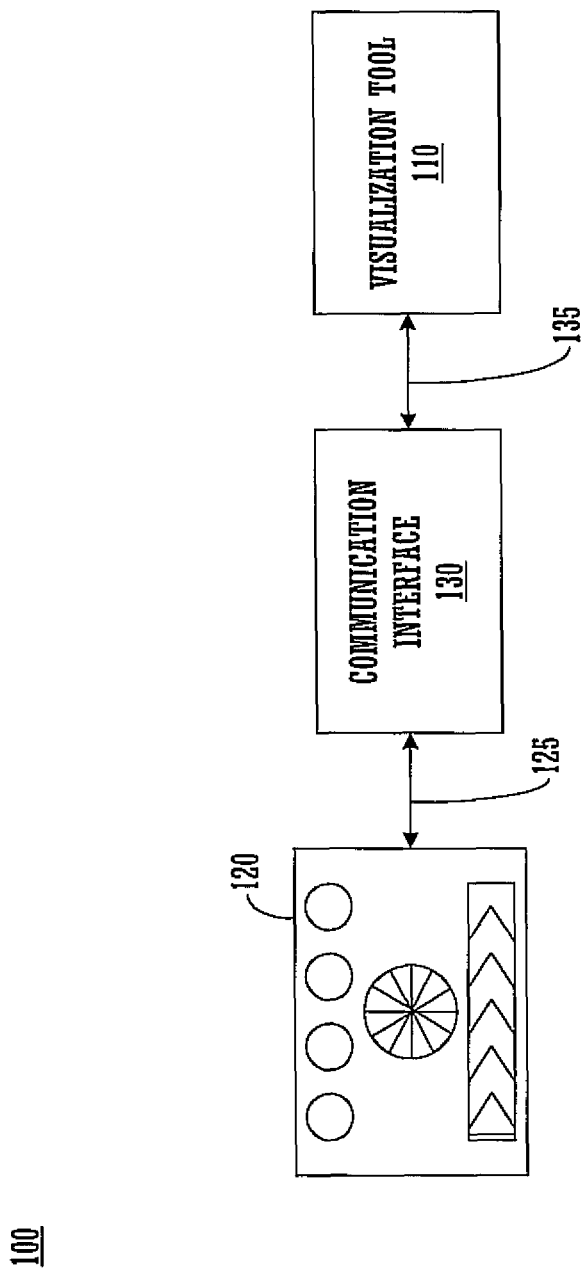
FIG. 1 illustrates a block diagram of a functional coupling of a novel visualization tool to target hardware, in accordance with embodiments of the present invention.

Reference will now be made in detail to various embodiments of the invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Notation and Nomenclature

Some portions of the detailed descriptions which follow (e.g., process 300) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussions, it is appreciated that throughout the present invention, discussions utilizing terms such as "indicating" or "displaying" or "accepting" or "producing" or "transmitting" or "receiving" or "advancing" or "comparing" or "processing" or "computing" or "translating" or "calculating" or "determining" or "excluding" or "recognizing" or "generating" or "assigning" or "initiating" or "collecting" or "transferring" or "switching" or "accessing" or "retrieving" or "receiving" or "issuing" or "measuring" or "conveying" or "sending" or "dispatching" or "advancing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

System and Method of Visualizing Capacitance Sensing System Operation

While exemplary embodiments of the present invention are illustrated with PSoC® devices, configuration software and common capacitance sensing applications, it is appreciated that embodiments in accordance with the present invention are not limited to such exemplary devices and applications, and are well suited to many types of configurable integrated circuits and software applications.

FIG. 1 illustrates a block diagram 100 of a functional coupling of a novel visualization tool 110 to target hardware 120, in accordance with embodiments of the present invention. Target hardware 120 may comprise a variety of capacitive sensors, e.g., capacitive sensors for buttons (switches), linear and radial sliders, touchpads, touchscreens and the like. As previously described, such capacitive sensors are influenced by various elements of a target hardware design.

Communications interface 130 provides a communications interface between the target hardware 120 and the visualization tool 110. In an exemplary PSoC® embodiment, a PSoC® device may be configured to provide an Inter-Integrated Circuit (I²C) communications port. In this embodiment, communication 125 is I²C communication. This port may be used to for two way information exchange with another computer, e.g., the computer environment of visualization tool 110. For example, target hardware 120 may receive commands from visualization tool 110, and report data to visualization tool 110.

Many PCs do not have an I²C port, and thus a communications interface 130 is useful. Communications interface 130 functionally couples target hardware 120 to visualization tool 110. In one embodiment, communications interface 130 may convert between universal serial bus (USB) communications 135 and I²C communications 125. It is appreciated that embodiments in accordance with the present invention are well suited to other communications protocols and may not require a communications interface 130. For example, the data can be sent to a development system, e.g., a PC, using Inter-Integrated Circuit (I²C) communications, Serial Peripheral Interface Bus (SPI) communications, universal asynchronous receiver/transmitter (UART) communications, universal serial bus (USB) communications, Ethernet communications, etc. An additional interface translator can be used to translate the data stream from one interface (for example, I²C) to communicate with interface(s) available in the PC, e.g., USB.

Visualization tool 110 is generally implemented on a desktop computer or workstation, e.g., a PC. This interface can be implemented by a combination of hardware and driver software layers. The software layers generally include corresponding drivers that handle low-level hardware interfaces and allow charting application operate using dedicated driver function calls or PC operating system API calls.

Figure 2:
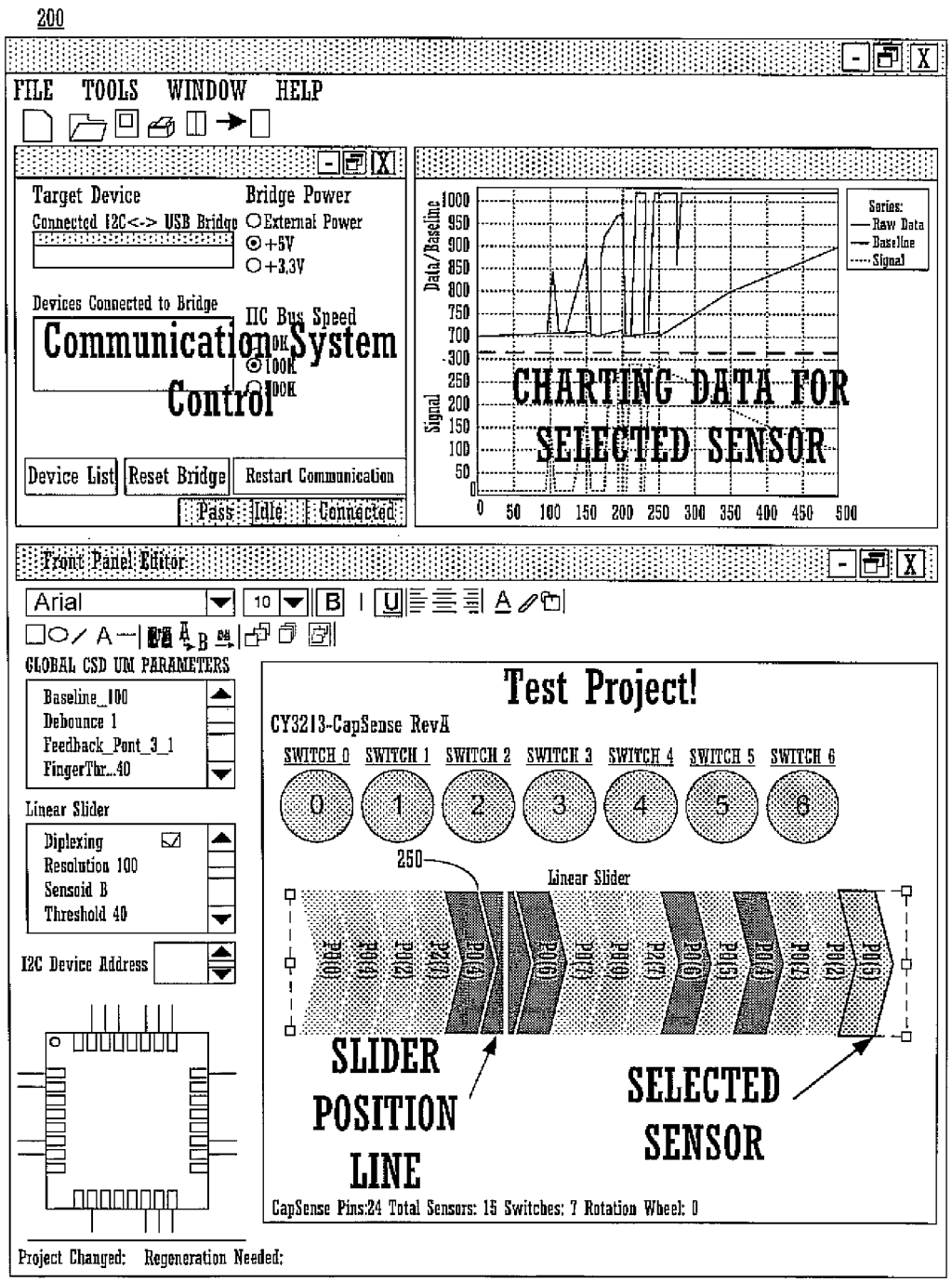
FIG. 2 illustrates an exemplary on-screen display of a novel capacitive sensing visualization tool, in accordance with embodiments of the present invention.

FIG. 2 illustrates an exemplary on-screen display 200 of a novel capacitive sensing visualization tool, in accordance with embodiments of the present invention. The capacitive sensing visualization tool may operate on a variety of computer platforms, e.g., a workstation and/or a PC. On-screen display 200 shows multiple windows, including communication system control window 210, charting data window 220 and front panel view window 230.

The data from a target device may be transferred to a capacitive sensing visualization tool application using a variety of communication interfaces, as previously described with respect to FIG. 1. Communication system control window 210 provides an interface to control such communication.

Charting data window 220 provides raw capacitance sensing data for a specific sensor or multiple sensors, identified in front panel view window 230, further described below. A highlighting scheme, e.g., color coding, may relate a selected sensor shown in front panel view window 230 with a corresponding trace or graph in charting data window 220. For example, selected sensor 235 may be highlighted in a green color, and the graph of data from selected sensor 235 may be displayed in charting data window 220 in a similar green color. In contrast with the conventional art, the commands necessary to obtain the data displayed in charting data window 220 are automatically generated and communicated to the test device, responsive to selecting a sensor in front panel view window 230.

Front panel view window 230 represents the physical arrangement of capacitive switches, sliders and the like that corresponds to the target hardware. For example, on the target hardware, switch 6 is to the right of switch 0, and a capacitive linear slider is located below the seven switches. The representation may be a schematic symbol, e.g., of a switch. Alternatively, the representation may be a physical analog of printed circuit board elements corresponding to the feature. For example, a linear slider, e.g., linear slider 250, may be represented by a row of shapes, corresponding to a printed circuit board metallization pattern.

Front panel view window 230 provides an intuitive physical interpretation of raw data, e.g., as displayed in charting data window 220. For example, each sensor state is indicated by highlighting, e.g., changing the color of, the sensor display in front panel view window 230 when the sensor is activated, e.g., a finger touches the sensor. In addition, the position of a finger in a radial or linear sliders is highlighted in using special pointers, e.g., slider position line 240. It is appreciated that it is very difficult for a user to determine a finger position on a slider device based on a data display, e.g., data displayed in charting data window 220. Advantageously, front panel view window 230 is able to present an intuitive, physical interpretation of the aggregate data in a much more useful manner.

Further, a specific sensor may be selected, e.g., selected sensor 235, via indication by a pointing device, e.g., "clicking" a mouse over the depiction of the sensor. Multiple sensors may be selected. By selecting a plurality of sensors, commands are generated by the visualization tool for the target hardware and/or interface system to relay the sensing data to the visualization tool. The information thus received is displayed in charting data window 220, as previously described.

Figure 3:
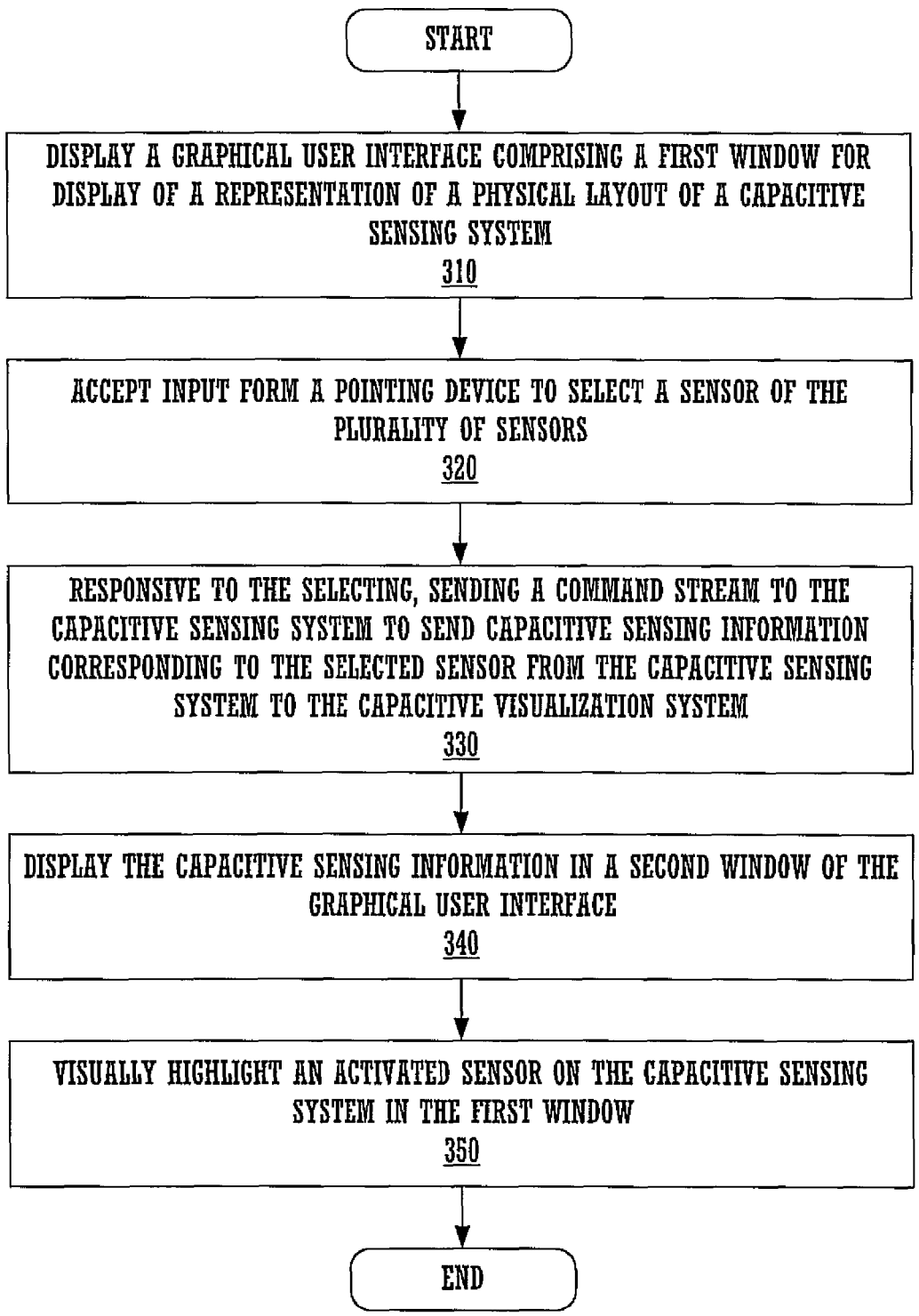
FIG. 3 illustrates an exemplary computer implemented method for visualizing capacitance sensing system operation, in accordance with embodiments of the present invention.

FIG. 3 illustrates an exemplary computer implemented method 300 for visualizing capacitance sensing system operation, in accordance with embodiments of the present invention. In 310, a graphical user interface is displayed comprising a first window for display of a representation of a physical layout of a capacitive sensing system, e.g., front panel view window 230 of FIG. 2. The capacitive sensing system comprises a plurality of sensors.

In 320, input is accepted from a pointing device to select a sensor of the plurality of sensors.

In 330, responsive to the selecting, a command stream is sent to the capacitive sensing system to send capacitive sensing information corresponding to the selected sensor from the capacitive sensing system to the capacitive visualization system.

In 340, the capacitive sensing information is displayed in a second widow of the graphical user interface, e.g., charting data window 220 of FIG. 2.

In optional 350, an activated sensor on the capacitive sensing system is visually highlighted in the first window. For example, a display element corresponding to a touched sensor may be visually highlighted, e.g., displayed in a different color. In addition, a derived position, e.g., for a slider, may be indicated, e.g., as with slider position line 240 of FIG. 2.

Beneficially, embodiments in accordance with the present invention improve usability and reduce the likelihood of errors during a configuration of an integrated circuit within a design. The novel configuration process is intuitive, providing a visual representation of the target hardware and sensor(s) for which data is displayed.

Embodiments in accordance with the present invention provide systems and methods of visualizing capacitance sensing system operation. Embodiments in accordance with the present invention also provide for systems and methods of visualizing capacitance sensing system operation that present capacitance sensing information in an intuitive manner corresponding to a physical arrangement of a target apparatus. In addition, systems and methods of visualizing capacitance sensing system operation that automatically generate commands to a target apparatus are provided. Further, embodiments in accordance with the present invention provide for systems and methods of visualizing capacitance sensing system operation that are compatible and complimentary with existing methods of integrated circuit device configuration.

Various embodiments of the invention are thus described. While the present invention has been described in particular embodiments, it should be appreciated that the invention should not be construed as limited by such embodiments, but rather construed according to the below claims.

What is claimed is:

1. A computing device to generate a graphical user interface for visualizing capacitance sensing system operation, the graphical user interface comprising:

a first window comprising a representation of a physical layout of an electrode pattern of a plurality of capacitive sensors of a capacitive slider of a target apparatus, wherein the first window is configured to represent a position of a conductive object proximate at least one of the plurality of capacitive sensors by providing an indication in the representation that corresponds to the position of the conductive object proximate the at least one of the plurality of sensors, wherein the graphical user interface is operable to accept input from a pointing device to select a capacitive sensor from the plurality of capacitive sensors for display of raw capacitive sensing data associated with the selected capacitive sensor; and a second window to display the raw capacitive sensing data associated with the selected capacitive sensor in response to a selection of the selected capacitive sensor, wherein the first window and the second window are displayed concurrently in the graphical user interface, and wherein the computing device is further configured to:

generate command information for the target apparatus to obtain the raw capacitive sensing data of the selected capacitive sensor to provide to the graphical user interface in response to the selection of the selected capacitive sensor, generate a chart using the raw capacitive sensing data of the selected capacitive sensor after obtaining the raw capacitive sensing data, and display the chart in the second window.

2. The computing device of claim 1 wherein the computing device is further configured to produce the command information for the target apparatus in response to selecting of the selected capacitive sensor.

3. The computing device of claim 1 wherein the first window is further to indicate activation of the selected capacitive sensor of the plurality of capacitive sensors.

4. The computing device of claim 3 wherein the first window visually highlights the selected capacitive sensor, and wherein the selected capacitive sensor is displayed in a highlighted color.

5. The computing device of claim 1 wherein a position of each of the plurality of capacitive sensors relative to others of the plurality of capacitive sensors within the representation of the physical layout corresponds to an actual position of each of the plurality of capacitive sensors relative to the others of the plurality of capacitive sensors on the target apparatus.

6. The computing device of claim 1 wherein the generated chart comprises at least one of count data or baseline data.

7. The computing device of claim 1 wherein the first window comprises a slider position indicator.

8. The computing device of claim 1 wherein the graphical user interface further comprises a third window to control a communication interface to functionally couple the target apparatus to the graphical user interface.

9. A method for visualizing a capacitance sensing system operation, the method comprising:
- displaying, by a computing device, a graphical user interface comprising a first window to display a representation of a physical layout of an electrode pattern of a plurality of capacitive sensors of a capacitive sensing system, the first window configured to represent a position of a conductive object proximate at least one of the plurality of capacitive sensors of the capacitive sensing system by providing an indication in the representation that corresponds to the position of the conductive object proximate the at least one of the plurality of sensors;
- accepting, by the computing device, input from a pointing device to select a capacitive sensor of the plurality of capacitive sensors from the representation of the physical layout for display of raw capacitive sensing data corresponding with the selected capacitive sensor;
- responsive to selecting the selected capacitive sensor, sending a command stream to the capacitive sensing system to send the raw capacitive sensing data corresponding to the selected capacitive sensor from the capacitive sensing system;
- generating a chart using the raw capacitive sensing data of the selected capacitive sensor after receiving the raw capacitive sensing data from the capacitive sensing system in response to the selecting of the selected capacitive sensor; and
- displaying the chart in a second window of the graphical user interface, wherein the first window and the second window are displayed concurrently in the graphical user interface.

10. The method of claim 9 further comprising visually highlighting an activated capacitive sensor on the capacitive sensing system in the first window.

11. The method of claim 9 wherein the generated chart comprises at least one of count data or baseline data.

12. The method of claim 9 wherein a position of each of the plurality of capacitive sensors relative to others of the plurality of capacitive sensors within the representation of the physical layout corresponds to an actual position of each of the plurality of capacitive sensors relative to the others of the plurality of capacitive sensors on a target apparatus.

13. The method of claim 12 wherein the raw capacitive sensing data is displayed in a highlighted color of the selected capacitive sensor.

14. The method of claim 9 wherein the first window comprises a slider position indicator.

15. A non-transitory computer-readable medium comprising instructions, that when executed by a computing device, perform operations comprising:
- displaying a graphical user interface comprising a first window for display of a representation of physical layout of an electrode pattern of a plurality of capacitive sensors of a capacitive sensing system, the first window configured to represent a position of a conductive object proximate at least one of the plurality of capacitive sensors of the capacitive sensing system by providing an indication in the representation that corresponds to the position of the conductive object proximate the at least one of the plurality of sensors;
- accepting input from a pointing device to select a capacitive sensor of the plurality of capacitive sensors within the representation for display of raw capacitive sensing data associated with the selected capacitive sensor;
- sending, responsive to selecting the selected capacitive sensor, a command stream to the capacitive sensing system to send the raw capacitive sensing data corresponding to the selected capacitive sensor from the capacitive sensing system;
- generating a chart using the raw capacitive sensing data of the selected capacitive sensor after receiving the raw capacitive sensing data from the capacitive sensing system in response to selecting the selected capacitive sensor; and
- displaying the chart in a second window of the graphical user interface, wherein the first window and the second window are displayed concurrently in the graphical user interface.

16. The non-transitory computer-readable medium of claim 15, wherein the operations further comprise producing command information for a target apparatus of the capacitive sensing system to provide the raw capacitive sensing data of the selected capacitive sensor to the graphical user interface.

17. The non-transitory computer-readable medium of claim 15,
wherein the generated chart comprises at least one of count data or baseline data.

18. The non-transitory computer-readable medium of claim 17 wherein a position of each of the plurality of capacitive sensors relative to others of the plurality of capacitive sensors within the representation of the physical layout corresponds to an actual position of each of the plurality of capacitive sensors relative to the others of the plurality of capacitive sensors on a target apparatus of the capacitive sensing system.

19. The non-transitory computer-readable medium of claim 17, wherein the operations further comprise displaying a slider position indicator in the first window.

20. The non-transitory computer-readable medium of claim 17, wherein the operations further comprise displaying a third window for control of a communication interface for functionally coupling a target apparatus to the graphical user interface.

* * * * *